United States Patent [19]
Gulde et al.

[11] Patent Number: 4,838,994
[45] Date of Patent: Jun. 13, 1989

[54] METHOD FOR STRUCTURING A COPPER AND/OR PERMALLOY LAYER BY MEANS OF DRY ETCHING

[75] Inventors: Peter Gulde, Berlin; Christian Scholz, Stockdorf, both of Fed. Rep. of Germany

[73] Assignee: Siemens Aktiengesellschaft, Munich, Fed. Rep. of Germany

[21] Appl. No.: 202,307

[22] Filed: Jun. 6, 1988

[30] Foreign Application Priority Data

Jun. 26, 1987 [DE] Fed. Rep. of Germany ....... 3721180

[51] Int. Cl.$^4$ .................... B44C 1/22; C03C 15/00; C03C 25/06; C23F 1/02
[52] U.S. Cl. .................... 156/643; 156/646; 156/652; 156/656; 156/659.1; 156/904; 204/192.34; 204/192.35
[58] Field of Search ............... 152/643, 646, 652, 656, 152/659.1, 661.1, 664, 666, 904; 204/192.34, 192.35

[56] References Cited
U.S. PATENT DOCUMENTS
4,557,796  12/1985  Druschke et al. .................. 156/643

FOREIGN PATENT DOCUMENTS
0054663  6/1982  European Pat. Off. .
0133621  8/1983  European Pat. Off. .

OTHER PUBLICATIONS
IBM Technical Disclosure Bulletin, vol. 21, No. 10, Mar. 1979, "Method of Tapering TaAuTa Conductor Cross Section for Improved Magnetic Bubble Device Performance", by J. Ahn et al., pp. 4186 and 4187.
J. Vac. Sci. Technol., 17(6), Nov./Dec. 1980, "Surface Texturing of Copper by Sputter Etching with Applications for Solar Selective Absorbing Surfaces", by P. M. Curmi et al., pp. 1320 through 1325.

Primary Examiner—William A. Powell

[57] ABSTRACT

A copper and/or permalloy layer is structured by means of dry etching. A layer of tantalum is applied as a mask to a layer to be structured, and a photoresist layer is applied to the tantalum layer. Subsequently, the structure of the photoresist layer generated in a photolithographic manner is transferred onto the mask by reactive ion etching. This procedure is continued until the copper or permalloy layer to be structured is exposed. The structuring of the copper or permalloy layer then occurs by ion beam etching.

12 Claims, 3 Drawing Sheets

METHOD FOR STRUCTURING A COPPER AND/OR PERMALLOY LAYER BY MEANS OF DRY ETCHING

BACKGROUND OF THE INVENTION

The invention is directed to a method for structuring a copper and/or permalloy layer on a substrate surface by means of dry etching by use of a metallic mask applied to the layer to be structured, this mask in turn carrying a photoresist layer that reproduces the geometry of the structure. The field of application of such a method is the general production of structured copper layers on electronic modules. In particular, however, it can also be employed in the manufacture of thin-film magnetic heads.

As a consequence of its very good electrical conductivity, copper is used to a great extent as a conductor track material in the manufacture of conductive connections on module substrates, PC cards, etc., and is nearly exclusively used in technology for thin-film magnetic heads. The conductive structures are usually produced in a photolithographic manner. A pattern of a photoresist layer corresponding to the desired conductive connections is first produced on a copper layer that is applied to a substrate surface. On the basis of a method that is still largely wet-chemical at present, the copper regions that are not protected by the photoresist are selectively etched out from the copper layer. Only the pattern of the conductive connections then remains on the substrate surface.

Steep etching edges, however, can not be achieved in practice with the known wet-chemical methods. Given progressive miniaturization of electronic circuits and also given increased numbers of turns in thin-film magnetic heads, it is therefore becoming increasingly more difficult to generate conductive patterns having the desired precision in a wet-chemical manner. Also, contaminants can be deposited on the parts to be etched from the etching baths themselves. These contaminations are less and less tolerable because of increasing miniaturization.

A different structuring method is employed in a wet chemical method. A titanium mask is first produced. The production of the actual copper structure in an ion beam etching process follows. The disadvantages of the wet-chemical method, however, can also be recognized on the finished copper structure given such a half wet and half dry structuring.

There have therefore been no lack of attempts to create usable copper structures with the assistance of exclusive dry etching processes. Thus, for example, the publication "Surface Texturing of Copper by Sputter Etching With Applications for Solar Selective Absorbing Surfaces" in the Journal of Vacuum Science Technology, Volume 17 (6), Nov./Dec. 1980, pages 1170 ff incorporated herein, discloses an attempt to erode copper by use of cathode sputtering in an argon atmosphere. The publication EP-A No. 0 133 621 corresponding to U.S. Pat. No. 4,557,796 incorporated herein, also discloses a method wherein copper is to be etched in dry fashion in a glow discharge that contains compounds having at least one methyl or methylene group. What is especially disturbing when etching with cathode sputtering, however, is that the eroded material is partly re-deposited onto the surfaces to be etched. Dry etching in a methyl atmosphere has not yet been able to become standard practice.

There have also been attempts to structure copper by plasma etching and by reactive ion etching. Halogen compounds are thus utilized as an etching reactant. Given copper, however, there is the difficulty that its halogen compounds do not become volatile until relatively high temperatures. Thus, the volatility temperature in a plasma etching process for copper, wherein the etching reactant is composed of iodine which forms copper iodide together with the copper, amounts to 500° C. and above.

EP-A No. 0 054 663 incorporated herein also discloses a method for etching copper with the assistance of reactive ion etching in an atmosphere containing carbon tetrachloride and alcohol. In this process, however, the organic polymers that are used as masks degrade.

Similar difficulties are presented in the previously disclosed methods for structuring permalloy that is particularly employed in the manufacture of thin-film magnetic heads. Two methods, a wet-chemical method and a dry structuring method with the assistance of four masks, are predominantly employed here. The wet-chemical method for structuring permalloy corresponds to the above-described method for structuring copper. The unprotected permalloy surface regions are etched away in an etching bath with the assistance of a photoresist mask that protects the permalloy layer lying therebelow. The significant disadvantage of this method lies in the uncleanness of all etched edges and in the angularity. Given thick structures of modern thin-film magnetic heads, this angularity lies on the order of magnitude of less than 45°. Such acute edges, however, lead to a low degree of neighboring track attenuation at the finished magnetic head. This is to be attributed to the acute edges acting like antennas on magnetic fields, and a high susceptibility to disturbance therefore results when recording and playing back electrical signals on magnetic discs.

The trend toward higher storage densities on magnetic discs, however, is continuing. Narrower and narrower tracks are being recorded on the magnetic discs. Furthermore, the tracks themselves are being placed closer and closer together. It therefore becomes increasingly more important to achieve high edge steepness in permalloy structures.

As in the case of copper layers, attempts have therefore also been made in permalloy layers to structure these with the assistance of dry etching processes. Precisely in the technology of magnetic heads, however, this presents great difficulties since the permalloy layers to be structured must be executed in relatively thick fashion in this application. Moreover, the relationship of the etching rates of permalloy to conventional photoresists is extremely unfavorable. For this reason, attempts to achieve dry etching of permalloy with the assistance of a photoresist structure directly applied to the permalloy in a photolithographic way have failed. A structuring of permalloy that is still satisfactory for high demands can therefore be implemented with satisfactory results only by use of metallic auxiliary masks. For example, titanium comes into consideration as a material for this mask. This material, however, itself in turn has the property that it cannot be directly structured with the assistance of a photoresist structure generated in a photolithographic way. The only makeshift solution remaining is that further auxiliary masks are employed, so that the structure of a photoresist layer can ultimately nonetheless be transferred onto an uppermost auxiliary mask lying therebelow. The individual auxiliary masks must be dismantled proceeding from above in step-by-step fashion in order to ultimately etch the structure into the first mask lying above the permalloy layer, and in order to be able to finally structure the permalloy layer itself. It is easy to see that the error frequency in such continued etching processes increases enormously. Furthermore, a dimensional tolerance occurs in every etching process, and a sequence of etching processes is hardly capable of proper control given so many process steps. Finally, such a complicated method is also extremely uneconomical. The dry structuring of permalloy layers has therefore not yet been satisfactorily achieved.

The present invention therefore proceeds on the assumption that wet-chemical methods do not meet the demands of progressive developments in the miniaturization of copper line tracks or paths in electronic circuits as well as in thin-film magnetic heads, nor does it meet them in permalloy structures in heads having extremely narrow system heights given relatively thick permalloy layers. For reasons of economy alone, previous solutions for dry etching methods in this field were incapable of proving satisfactory and, over and above this, likewise do not lead to the desired results in qualitative terms.

SUMMARY OF THE INVENTION

It is therefore an object of the present invention to create a method of the type initially cited by which both copper as well as permalloy can be structured with high dimensional accuracy and with optimally steep edges, despite the fact that relatively great layer thicknesses are also required in certain applications.

In combination with the method of the type initially cited, this object is inventively achieved in that a layer of tantalum is applied as a mask to the layer to be structured. The structure of the photoresist layer generated in a photolithographic manner is subsequently transferred onto the mask with reactive ion etching. This process is continued until the copper or the permalloy layer to be structured is exposed. The structuring of this latter layer occurs with ion beam etching.

Accordingly, a significant feature of the invention is in using tantalum as a material for a metallic mask both when structuring copper as well as for permalloy layers. As must always be demanded for a masking layer, this material has adequate adhesion to the layer of copper or the permalloy to be structured. Eve more importantly, it can in turn be dry etched by design with a photoresist structure directly applied to its surface in a photolithographic manner, and is capable of being dry etched with high dimensional accuracy with the assistance of known apparatus. Particularly compared to the proposed solutions for dry etching permalloy layers, the solution of the invention thus has the great advantage that no further auxiliary masks for transferring a structure of the photoresist layer onto the layer actually to be structured are required. Not only is the number of process steps thus considerably reduced, but the dimensional accuracy to be achieved in the corresponding etching process is simultaneously enhanced, given a reduced error frequency. The economic feasibility of the manufacturing process is thus decisively improved.

In accordance with a development of the invention, the thickness of adjacent layers is respectively selected in accordance with the selectivity, i.e. in accordance with the relationship of the etching rates of these adjacent layers. It is thus assured that the respective etching process can be carried out to its conclusion without the transferred structure suffering errors in its geometry.

In accordance with another development of the invention, sulphur hexafluoride is used as a gas in the reactive ion etching. This gas has the special advantage that the highly reactive fluorine occurs in high concentration in the plasma stream, so that the etching process can thus be implemented in a relatively short time.

According to another development of the invention, the reactive ion etching is executed at a limit pressure that is related to a bias voltage of the etching apparatus which limits the etching attack. For example, the limit pressure is set such that the ratio of the remaining layer thickness after the etching process to the original layer thickness of the photoresist lies above 0.5 and preferably is 0.6. In reactive ion etching, as is known the bias voltage established in the etching apparatus is a function of the gas pressure selected. Low gas pressure effects a high bias voltage which in turn results in a high acceleration of the ions in the plasma. Thus, a reactive ion etching system operates on an essentially physical basis at low gas pressures. This procedure, however, attacks the photoresist to an extremely pronounced degree. Analogously, a high gas pressure results in a low bias voltage of the ion etching system, so that chemical etching predominates at high gas pressures. The desired edge steepnesses of the transferred structures, however, can only be inadequately realized with chemical etching. The limit pressure defined according to the improvement of the invention fixes an operating mode of the reactive ion etching system at which both physical as well as chemical etching occur with roughly equal priority. Thus, first an undesirably high stressing of the photoresist layer is avoided; and second, the undesired accompanying phenomena of purely chemical etching can still be controlled.

According to another development of the invention, the remaining process variables for reactive ion etching, namely those for the microwave power introduced and for the flow-through quantity of the gas, are set such that an etching rate that comes close to the maximum etching rate is established for the mask layer.

The etching time is optimized in this way, which is of critical significance for all dry etching processes.

DESCRIPTION OF THE PREFERRED EMBODIMENTS

Figure 1:
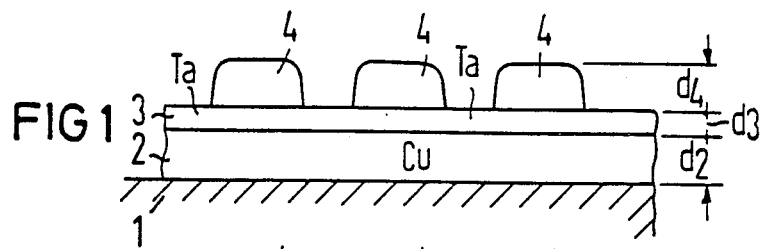
FIGS. 1 through 3 show in schematic fashion the structuring of a copper layer with the assistance of a tantalum mask in successive process steps, whereby the mask structure is created by reactive ion etching and the ultimate structure of the copper layer is created by ion beam etching.

As schematically shown in FIG. 1, an inventively developed method for structuring copper and/or perm-alloy layers proceeds on the basis of a blank manufactured in conventional technology. As an exemplary embodiment of the invention, a copper layer 2 is superficially applied on a substrate 1 therein. The layer thickness $d_2$ of this copper layer is thus dependent on the respective application. Likewise, corresponding to the respective application, this layer is to be structured by dissolving individual surface regions, so that the remaining structure forms conductor tracks or paths on module substrates and PC cards and, for example, also forms windings of coils in applications in thin-film magnetic head technology.

The structuring of photo layers in a purely photolithographic way has proven itself in many instances. In the present instance, however, applications within the framework of a highly developed miniaturization having extremely fine structure is envisioned. Also potentially added thereto as a complicating factor is that the employed layer thicknesses of the conductive structure are nonetheless relatively thick. The conventional manufacturing method preferably based on chemical etching with the assistance of liquid electrolytes is inadequate in these instances, particularly because the edges of conductor paths or tracks are not adequately uniform given free structures, and, moreover, are frequently either not clearly etched out or, on the other hand, are already undercut.

The present instance therefore works with a metallic mask 3 that is placed over the copper layer 2. In the present instance, this mask 3 is composed of tantalum and has a layer thickness $d_3$. The relationship of this layer thickness $d_3$ to the thickness $d_2$ of the copper layer 2 shall be discussed hereafter.

Finally, the mask 3 is covered with a photoresist layer 4. It is hardened or cured in a conventional technology, is exposed by locations in accordance with the prescribed structure, i.e. is fixed and the non-fixed surface regions of the photoresist layer 4 are subsequently dissolved out in a chemical way. What remains is a structure as schematically shown in FIG. 1 wherein the individual surface regions remain which are at least partially separated from one another in the photoresist layer 4. These have a uniform layer thickness $d_4$.

The module substrate prefabricated to this extent is manufactured in a conventional technology. The structure generated in the photoresist layer 4 is now transferred onto the mask 3 in accordance with the method of reactive ion etching. This method and apparatus for the implementation of this dry etching process are known per se. Such an apparatus for reactive ion etching is therefore only schematically shown in FIG. 4. The substrate 1 is arranged on a receptacle plate 6 in an etching chamber 5. This receptacle plate 6 simultaneously forms one electrode of the etching apparatus. The cooperating electrode is formed of a metallic screen 7 arranged above the receptacle plate 6. The electrodes are connected to respective outputs of a microwave generator 8. The dry etching process is executed in a gas stream, sulfur hexafluoride $SF_6$ being used in the present case. The employed gas has the great advantage of a high fluorine constituent that represents the critical chemical reactant. The precondition for a relatively short etching time is thus created. The gas stream, frequently referred to as "flow" in this technology, is adjustable via a flow meter 9. The gas pressure in the etching chamber 5 is measured via a pressure gauge 10 and is likewise adjustable. As schematically indicated, this occurs since the pressure momentarily measured in the etching chamber 5 by the pressure gauge 10 is compared to a preset value, and a controllable valve 11 is then actuated in an outlet channel dependent on the result of this comparison.

Figure 4:
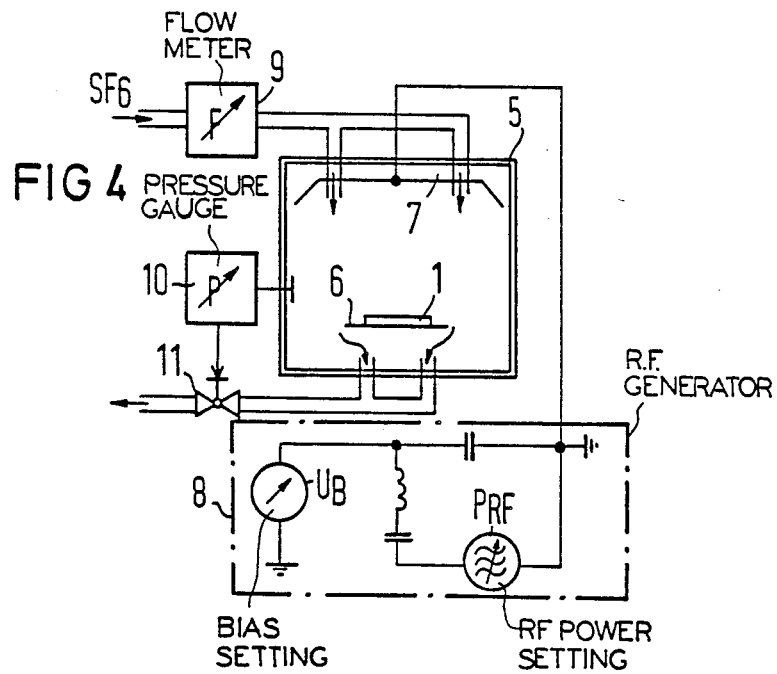
FIG. 4 is a schematic view of an apparatus for reactive ion etching.
Figure 5:
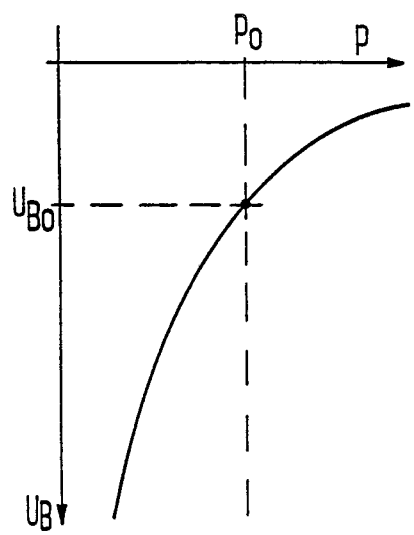
FIGS. 5 through 8 show in various diagrams qualitative characteristics of individual operating parameters of the etching apparatus of FIG. 4.

FIG. 4 schematically indicates that the microwave generator 8 is operated with a bias voltage $U_B$ that is frequently referred to as bias in this technology. In the form of a diagram, FIG. 5 shows that there is a physical relationship between the pressure p in the etching chamber 5 and this bias $U_B$. Low pressure in the etching chamber results in a high bias $U_B$. This bias exponentially decreases with increasing pressure p. A high bias of the radio frequency generator 8 causes a high ion acceleration in the direction toward the receptacle plate. Given a high bias, the physical component of the dry etching process is dominant. Inversely, the chemical component of the etching process predominates, given a low bias $U_B$. In FIG. 5, $P_o$ references a pressure that is to be allocated roughly to the transition region between the physical and the chemical etching, and is therefore referred to as a limit or boundary pressure. With reference to the module substrate illustrated in FIG. 1, the photoresist layer 4 is sharply attacked in a reactive ion etching process having a pressure $p < p_o$, i.e. given a predominantly physical component. By contrast thereto, the mask layer 3 is undercut given higher pressures, i.e. given a pressure $p > p_o$ and given a predominantly chemical etching. This means that the desired edge steepness is thus not achieved.

Figure 6:
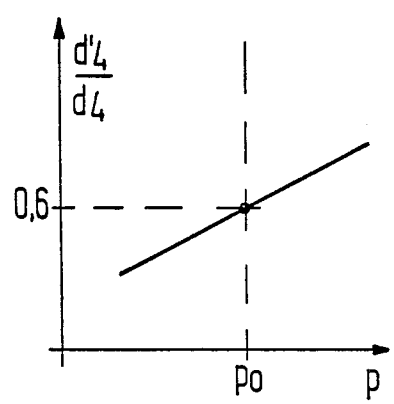

The influence of the gas pressure p in the etching chamber 5 on the photoresist layer 4 is shown again in FIG. 6. The remaining layer thickness of the photoresist layer is referenced $d'_4$, i.e. this defines the layer thickness which remains after the reactive ion etching. In light of the above presentation, it is clear that the relationship of the remaining layer thickness $d'_4$ to the original layer thickness $d_4$ of the photoresist layer 4 increases with increasing gas pressure p. In accordance with the present technical teaching, then, the gas pressure p in the etching chamber 5 should be set to a limit or boundary pressure $p_o$ such that this relationship of $d'_4/d_4$ amounts to about the value 0.6. One of the operating parameters of the apparatus for reactive ion etching is thus determined.

Figure 7:
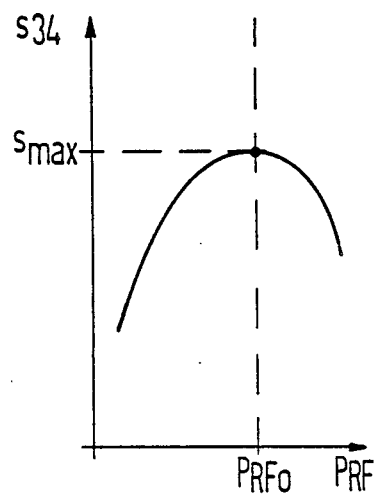

However, the erosion of the photoresist layer 4 is not to be considered as being disassociated from the etching process acting upon the mask layer 3. There is an individual etching rate for both that is in turn dependent on the radio frequency power $P_{RF}$ of the radio frequency generator 8. The relationship between the respective etching rates is usually referred to as selectivity. In the present case, let the relationship of the etching rates $r_E$ of the mask layer 3 to the photoresist layer 4 be referenced as selectivity $s_{34}$. This relationship can also be empirically identified for different photoresists, depending on the radio frequency power. The curve of the selectivity $s_{34}$ of the mask layer 3 formed of tantalum to the photoresist layer 4 is qualitatively shown in FIG. 7. The selectivity $s_{34}$ reaches a maximum $s_{max}$ at a defined radio frequency power, referred to as the limit or boundary power $P_{RFO}$. This referencing is analogous to the referencing of the limit or boundary pressure $p_o$. This is the desired, optimized value at which the etching process sequences as beneficially as possible (i.e. time-optimized as well) with reference to the mask layer 3 composed of tantalum in comparison to the photoresist layer 4. The second operating parameter is thus determined.

Figure 8:
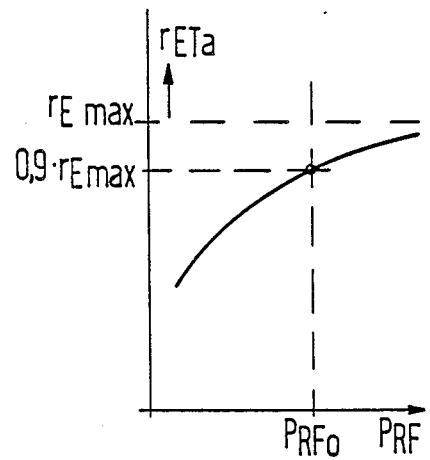

For illustration, the curve of the etching rate $r_{ETA}$ for tantalum dependent on the radio frequency power $P_{RF}$ is shown as a diagram in FIG. 8. The curve approaches a maximum etching rate $r_{Emax}$ asymptoticaally with increasing radio frequency power. For the selected, optimized value of the radio frequency power $P_{RFO}$, it may be derived that roughly 0.9 times this maximum etching rate can thus be achieved.

All operating parameters for an optimized process of reactive ion etching according to the present technical teaching are thus determined. Now returning to the illustration in FIG. 1, the above commentaries on this process step also make it clear how the relationship of the layer thicknesses $d_3$ to $d_4$ must be selected for this application. According to the comments on the selectivity $s_{34}$ between tantalum and photoresist, the following condition results for the layer thickness $d_4$ of the photoresist layer 4:

$$d_4 \geq d_3/d_{34}. \quad (1)$$

Figure 2:
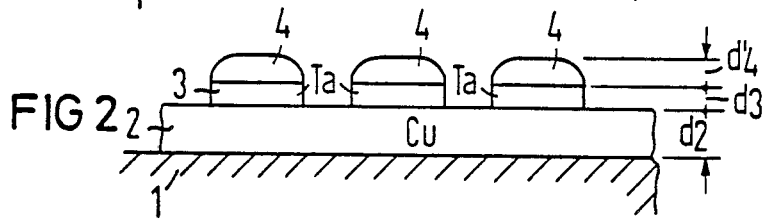
Figure 9:
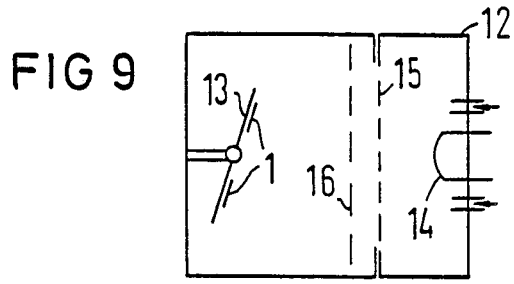
FIG. 9 is a schematic illustration of an apparatus for ion beam etching.

When a module substrate according to FIG. 1 is now subjected to a process of reactive ion etching in an apparatus of FIG. 4 under the described boundary conditions, then a structure shown in FIG. 2 results. The photoresist 4 is eroded down to a remaining layer thickness $d'_4$, and only the covered surface regions of the mask layer 3 are preserved. The desired structure has thus been transferred onto the mask layer 3 and the copper layer 2 has been exposed, except for the covered surface regions. The structuring of the copper layer by use of the tantalum mask in accordance with the present technical teaching now occurs on the basis of ion beam etching. In and of itself, this process is a conventional process and etching equipment to be utilized therefor are known per se. For this reason, FIG. 9 likewise merely schematically illustrates an apparatus for ion beam etching. A receptacle plate 13 is again arranged in an etching chamber 12, this receptacle plate 13 rotating in the operating condition and carrying substrates 1. A cathode 14 is provided in the etching chamber lying opposite the receptacle plate. A grating 15 and a neutralizer 16 are fixed between the cathode 14 and the receptacle plate 13. An etching reactant is admitted and discharged via respective inflow and outflow channels. In the present case, the process step of ion beam etching is to sequence in an argon atmosphere in accordance with completely conventional rules. For this reason, it seems superfluous here to describe this process step in yet greater detail.

Figure 3:
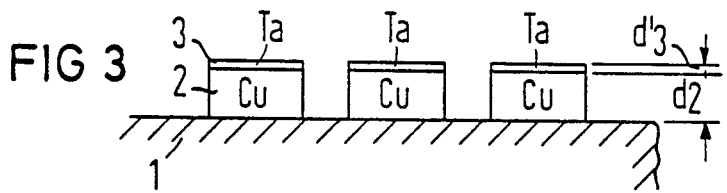

With reference to the prepared module substrate 1 of the illustration of FIG. 2, it need only be recited here that, of course, the selectivity between tantalum as the material for the mask layer 3 and copper as the actual layer 2 to be structured must also be taken into consideration. Analogous to the relationship 1, the relationship $$d_3 \geq d_2/s_{23}, \quad (2)$$

is valid here for the thickness $d_3$ of the mask layer 3, whereby the selectivity $s_{23}$ is the relationship of the etching rate $r_{ECu}$ of copper to the etching rate $r_{ETa}$ of tantalum under the operating conditions that are defined in the process of ion beam etching. Under these preconditions, the structure shown in FIG. 3 results for the module substrate 1 shown in FIG. 2 after the process of ion beam etching. This FIG. 3 shows the completely structured copper layer 2 on the substrate 1, this copper layer 2 being now covered only by a thin mask 3 having the remaining layer thickness $d'_3$.

Figure 10:
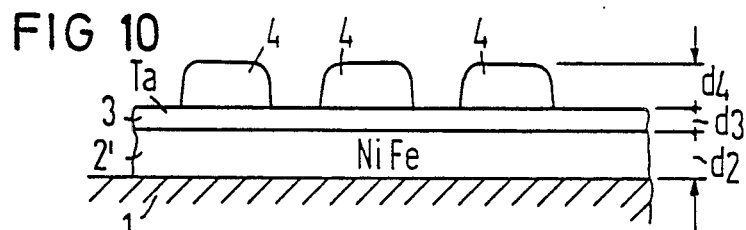
FIGS. 10 through 14 show in schematic fashion the structuring of a permalloy layer with the assistance of a tantalum mask, as a further example of the invention.

The structuring of a copper layer on a substrate has been set forth in detail above. In the technology for thin-film magnetic heads, however, permalloy layers must also be structured in addition to such copper layers. According to the present technical teaching, this can be achieved in a similar way, again with a succession of process steps composed of reactive ion etching and ion beam etching. In a form similar to FIGS. 1 through 3, FIGS. 10 through 14 schematically show such a sequence for the structuring of a permalloy layer. Analogous to FIG. 1, FIG. 10 shows a module substrate prepared in conventional technology and comprising a permalloy layer 2' as the layer to be structured. A mask 3 of tantalum is again applied thereover, this mask 3 being in turn covered by an already structured photoresist layer 4 in individual surface regions.

Figure 11:
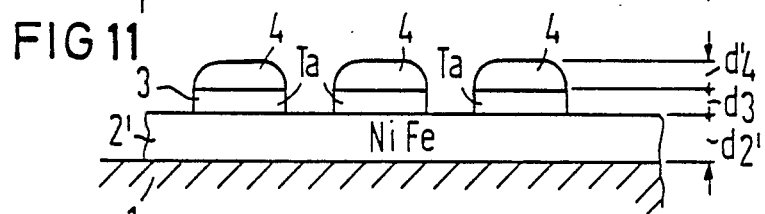
Figure 12:
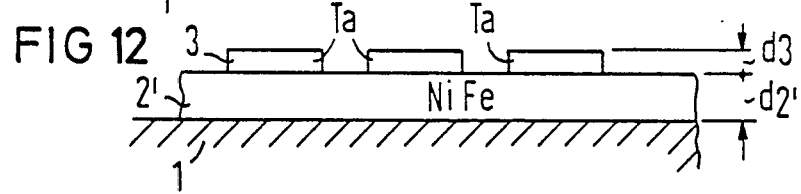
Figure 13:
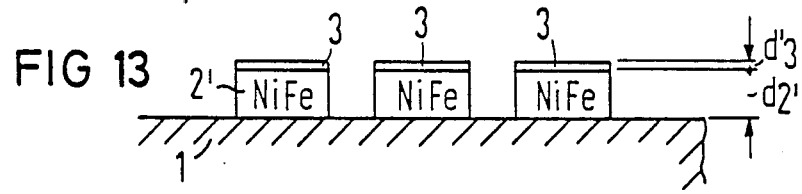
Figure 14:
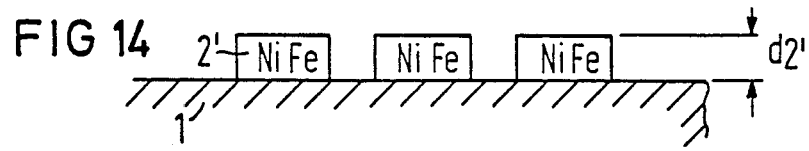

The rules already set forth in detail for the structuring of the copper layer 2 apply by analogy for the structuring of this permalloy layer 2', so that a detailed description can be foregone here. In summary, let the process sequence therefore be only briefly sketched with reference to FIGS. 10 through 14. Analogous to FIG. 1, FIG. 10 shows the module structure after the finishing of the structure in the photoresist layer 4 and before the first, critical process step here of reactive ion etching. Analogous to FIG. 2, FIG. 11 shows the module structure following the reactive ion etching wherein the mask layer 3 is structured and the permalloy layer 2' is partially exposed. FIG. 12 illustrates a subsequent intermediate step wherein the formed mask structure is chemically decoded, i.e. the residue of the photoresist 4 that still remains is eroded. The substrate is thus prepared for the ion beam etching. FIG. 13 shows the substrate structure following the ion beam etching. The permalloy layer 2' is structured and only a thin remaining layer of the mask 3 of tantalum is preserved on this structure. This remainder is also eroded by a further process step with reactive ion etching. After that, only the structured permalloy layer 2' remains, as shown in FIG. 14.

In terms of production engineering, the method that has been set forth has the advantage that essentially the same method steps or apparatus can be utilized for a defined technology, for example in the manufacture of thin-film magnetic heads, for structuring two different materials such as copper and permalloy. Over and above this, structures having the desired properties result, particularly having a high edge steepness and uniformity of edge path.

The operating parameters in the etching processes according to the invention are adaptable to many specific requirements in individual applications.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for structuring by dry etching a copper or permalloy alloy layer on a substrate surface, comprising steps of:

applying a tantalum layer to be made into a metallic mask for transferring a desired structure to said copper or permalloy alloy layer;

photolithographically generating a photoresist layer having said desired structure on the tantalum layer;

transferring onto the tantalum layer metallic mask the desired structure of the photoresist layer through reactive ion etching, and continuing this procedure until the copper or permalloy alloy layer to be structured is exposed; and employing ion beam etching in connection with the structured tantalum layer metallic mask to structure the copper or permalloy alloy layer.

2. A method according to claim 1 wherein the tantalum layer metallic mask is supplied with a layer thickness such that the metallic mask is not completely eroded even after said step of ion beam etching based upon a selectivity relationship between an etching rate of the material of the copper or permalloy alloy layer compared to an etching rate of the material of the tantalum layer metallic mask.

3. A method according to claim 1 including the step of applying said photoresist layer with a layer thickness based on a selectivity between an etching rate of a material of the tantalum layer metallic mask compared to an etching rate of a material of the photoresist layer such that the photoresist layer is not completely eroded following the reactive ion etching step.

4. A method according to claim 1 including the step of applying as a gas in the reactive ion etching step sulfur hexafluoride.

5. A method according to claim 1 wherein the step of reactive ion etching is implemented at a gas pressure limit related to a bias provided during the reactive ion etching such that attacking of the resist is limited, said limit gas pressure being chosen such that a ratio of a photoresist remaining layer thickness following the etching process compared to an original layer thickness of the photoresist layer is above 0.5.

6. A method according to claim 5 wherein the ratio of the remaining layer thickness following the etching process to the original layer thickness of the photoresist layer is substantially 0.6.

7. A method according to claim 1 wherein for the reactive ion etching step, process variables for applied radio frequency power and flow quantity of the gas are set such that an etching rate for the tantalum layer metallic mask results which is close to a maximum etching rate of tantalum.

8. A method according to claim 7 wherein the reactive ion etching step is implemented with a radio frequency power chosen such that an etching rate of the tantalum material of the mask is 0.9 times the maximum etching rate of tantalum.

9. A method according to claim 7 wherein for the reactive ion etching step, a process variable selected for the applied radio frequency power is such that a selectivity defined as a ratio of an etching rate of the tantalum material for the mask compared to an etching rate of the photoresist layer is at a maximum.

10. A method for structuring by dry etching a copper or permalloy alloy layer on a substrate surface, comprising steps of:

applying a tantalum layer to be made into a metallic mask for transferring a desired structure to said copper or permalloy alloy layer;

generating a layer having said desired structure on the tantalum layer;

transferring onto the tantalum layer metallic mask the desired structure of the structured layer through reactive ion etching; and employing ion beam etching in connection with the structured tantalum layer metallic mask to structure the copper or permalloy alloy layer.

11. A method for structuring by dry etching a copper layer on a substrate surface, comprising steps of:

applying a tantalum layer to be made into a metallic mask for transferring a desired structure to said copper layer;

photolithographically generating a photoresist layer having said desired structure on the tantalum layer;

transferring onto the tantalum layer metallic mask the desired structure of the photoresist layer through reactive ion etching, and continuing this procedure until the copper layer to be structured is exposed; and employing ion beam etching in connection with the structured tantalum layer metallic mask to structure the copper layer.

12. A method for structuring by dry etching a permalloy alloy layer on a substrate surface, comprising steps of:

applying a tantalum layer to be made into a metallic mask for transferring said desired structure to said permalloy alloy layer;

photolithographically generating a photoresist layer having said desired structure on the tantalum layer;

transferring onto the tantalum layer metallic mask the desired structure of the photoresist layer through reactive ion etching, and continuing this procedure until the permalloy alloy layer to be structured is exposed; and employing ion beam etching in connection with the structured tantalum layer metallic mask to structure the permalloy alloy layer.

* * * * *